Feb. 22, 1927.
F. J. RAYCRAFT
SANITARY DENTAL FLOSS HOLDER
Filed June 13, 1925
1,618,351
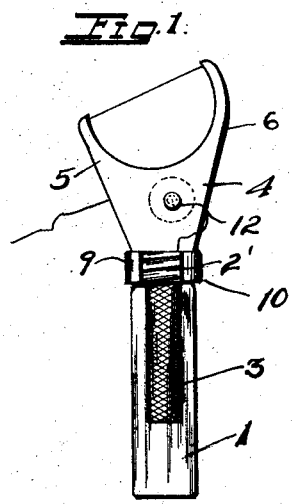
Fig. 1.
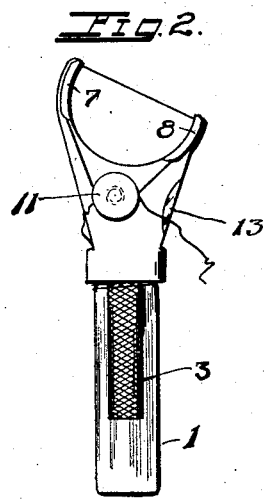
Fig. 2.
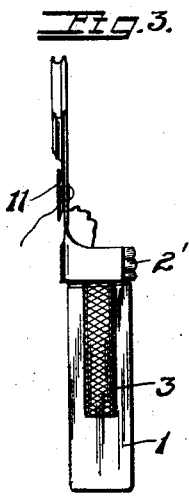
Fig. 3.
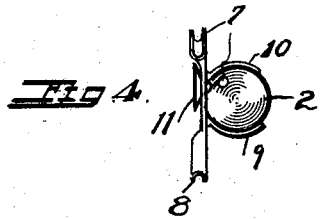
Fig. 4.
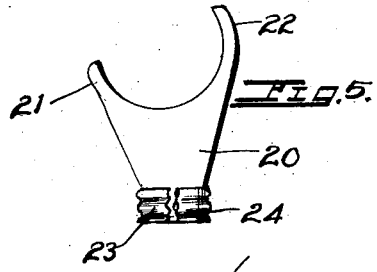
Fig. 5.
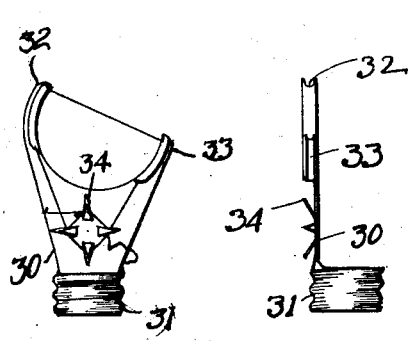
Fig. 7.  Fig. 8.  Fig. 6.
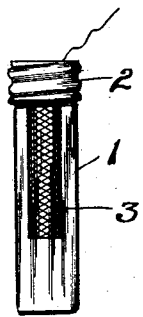
INVENTOR.
Francis Joseph Raycraft.
BY Carlot P. Griffin
ATTORNEY.

Patented Feb. 22, 1927.

1,618,351

UNITED STATES PATENT OFFICE.

FRANCIS JOSEPH RAYCRAFT, OF SAN FRANCISCO, CALIFORNIA.

SANITARY DENTAL FLOSS HOLDER.

Application filed June 13, 1925. Serial No. 36,962.

This invention relates to a sanitary dental floss holder, and the object of the invention is to provide means whereby short lengths of dental floss may be made use of for cleaning the teeth, and removing occluding masses of food therefrom.

It will be understood by dentists, and others, that it is very inconvenient to use a piece of dental floss without some means of holding it when passing it between the teeth.

With the present invention the holder is applied to a small bottle in which the dental floss is sold, and a very short section of the floss is held in a position convenient for use, it being unnecessary to insert the fingers into the mouth to pass the floss between the teeth.

Another object of the invention is to provide a holder which may be applied directly to the bottle containing the floss, in which the floss is ordinarily sold, or which may be applied to the cap of the bottle; either form of the invention being usable, and affording a sanitary means for holding the dental floss.

Other objects of the invention will appear as the description proceeds.

An embodiment of the invention is shown in the accompanying drawings, in which the same reference numeral is applied to the same portion throughout, but I am aware that there may be modifications thereof.

Fig. 1 is a side elevation of a bottle containing a roll of dental floss with this holder applied thereto.

Fig. 2 is a side elevation of the dental floss holder looking from the back of Fig. 1.

Fig. 3 is an edge elevation of the dental floss holder.

Fig. 4 is a plan view of a modified form of the dental floss holder, which is intended to be screwed on one of the screw caps of the ordinary vial containing dental floss, such as is purchased in drug stores.

Fig. 5 is a side elevation of the holder shown in Fig. 4.

Fig. 6 is a side elevation of one of the bottles containing the dental floss, as it is ordinarily dispensed in drug stores.

Figures 7 and 8 are in elevation at right angles to each other of a floss holder in which the threaded portion of the holder is adapted to be secured directly upon the bottle, or if made of a larger size, it may be threaded on the bottle cover.

The numeral 1 indicates an ordinary vial, with a screw 2'. This vial contains a small roll of dental floss, indicated at 3, and this is the ordinary form of dispensing dental floss in drug stores.

The present invention consists of a flat plate 4, which is provided with two arms 5 and 6, said arms having flanges 7 and 8 to form grooves at the ends thereof, around which the dental floss may be passed to hold it.

At the bottom the holder is permanently connected to the cap 2' by means of the arms 9 and 10, which arms may be soldered, or otherwise secured to the cap 2'.

A small frusto-conical plate 11 is secured to the side of the plate 4 by means of a rivet 12, the object being to form a post around which the dental floss may be wrapped and wedged to secure it tightly between the two ends of the two arms 7 and 8.

The side of the plate 4, may be slightly sharpened at 13 to afford means for easily cutting the dental floss.

In the form of the invention shown in Figs. 4 to 6 inclusive, the plate 20 has the arms 21 and 22, precisely the same as in the previous form of the invention; while the arms 23 and 24 are sufficiently springy to be able to screw over the top of the cap 2, and tightly secure the floss holder to said cap, just as it is sold by the drug stores.

It will be seen that the invention may be sold in two forms. One form, with the cap 2' permanently secured to the two arms 9 and 10; in which event, the cap purchased from the drug store, with the floss and the bottle, is thrown away, and the cap 2', with its associated plate 4, is then screwed on the bottle, and the dental floss is threaded through a hole in said cap 2'.

The other form of the invention is simply screwed on the cap 2, which comes with the ordinary bottle as sold in the drug stores.

In use, a length of the dental floss is pulled out, several turns are then passed around the rivet 12, under the plate 11, the floss is then passed over the two arms 7 and 8, and several more turns are passed around the rivet 12, the floss being drawn tightly between the two arms 7 and 8, whereupon it is ready for use.

If desired the form of the invention shown in Figs. 7 and 8 may be used. In this form the plate 30 has the cap 31 formed integral therewith in a single punching operation. The plate has the grooved arms 32 and 33 to hold the thread, and it also has four prongs 34 raised therefrom to afford an abutment around which the dental floss may be wound to hold it tightly when in use. In this form of the invention the cap is intended to fit the bottle the same as the original cap supplied therewith.

What I claim is as follows, but modifications may be made in carrying out the invention shown in the drawings, and in the above particularly described form thereof, within the purview of the claims herein:

1. A dental floss holder comprising a flat plate having a threaded member formed on the bottom portion thereof, a U shaped opening in the top portion of said plate, the upper ends of the U shaped arms having turned over edges forming grooves, tongues cut in the side of said plate and bent out to form means for holding both ends of a length of dental floss.

2. A dental floss holder comprising a single piece of material, a flat plate having a U shaped upper end, turned out portions on the inner edges of said U shaped end to form grooves adapted to hold dental floss without gripping it, raised prongs punched out of the side of said plate for holding both ends of a length of dental floss in tension in said grooves and spanning the top of said U shaped end, and a threaded member on the lower end of said plate.

In testimony whereof I have hereunto set my hand this 20" day of May, A. D. 1925.

FRANCIS JOSEPH RAYCRAFT.